March 8, 1966 H. IRNIGER 3,239,647
WELDING SYSTEM
Filed April 22, 1963

INVENTOR.
HANSHEIRI IRNIGER
BY
McGlew & Toren
ATTORNEYS.

United States Patent Office 3,239,647
Patented Mar. 8, 1966

3,239,647
WELDING SYSTEM
Hansheiri Irniger, Zurich, Switzerland, assignor to Verwaltungsgesellschaft der Werkzeugmaschinenfabrik Oerlikon, Zurich, Switzerland
Filed Apr. 22, 1963, Ser. No. 274,450
Claims priority, application Switzerland, Apr. 27, 1962, 5,079/62
1 Claim. (Cl. 219—130)

This invention relates in general to welding devices, and in particular to a new and useful electric welding system including a welding burner with a connecting cable assembly having means for feeding a consumable welding electrode and a protective gas in the same cable supplying the welding current, and wherein the burner nozzle and preferably the end of the cable connecting to the welding apparatus includes disconnectable socket portions.

The present invention relatives particularly to a welding system in which a thin wire is employed as a self-consuming electrode as build-up material for welding by an electrical resistance method with the use of a protective gas. Prior to the present invention, apparatus of this type included a welding burner head providing a handle constituting the actual welding tool, with a flexible cable which connects to the large welding apparatus, which cable contains the leads for the welding wire and, in some instances, a protective gas. A disadvantage of constructions of this nature is that the burner head and the nozzle were difficult to manipulate, and the burner head could not be oriented to accurately position the nozzle of the burner head in relation to the work piece while at the same time permitting easy operation of the control associated with the burner head. A further disadvantage was that it was also necessary to provide separate means for orienting the feed of the electrode in respect to the burner for carrying out the welding process.

In accordance with the present invention, there is provided a welding device which includes a burner head having interconnectable socket and plug portions and a connecting cable which connects to the welding apparatus through similar interconnectable socket and plug portions. The device further includes means for feeding a consumable electrode through the connecting cable to the burner head for discharge through the nozzle of the head directly at the apparatus being welded. The device includes a curved burner head portion which may be oriented in a definite working position relative to the work piece. The connection of the curved portion to the remaining portion of the head is by socket and plug connection which permits pivotal movement of the curved portion so that the welder may always position the handle with the control element thereon in an advantageous position for holding and control and then orient the end of the nozzle, as desired, in respect to the work piece.

A further advantage of the construction is that the burner nozzle portion of the burner head may be easily removed and replaced by a new burner nozzle portion in those instances where a different size nozzle is necessary or a defective nozzle has been discovered. By making the welding apparatus with a burner head which is connected to a flexible cable through which the electrode and the protective gas are fed, it is possible to control the operation in a very simple manner by means of a single electrical control button for regulating the electric current and the welding electrode feed located on the burner head. The cable itself may be disconnected from the connection to the apparatus supplying the welding current and the protective gas by a simple plug and socket connection element.

Accordingly, it is an object of the present invention to provide an improved welding apparatus.

A further object of the invention is to provide a welding device which includes a burner head having a connectable cable for supplying a protective gas and a consumable electrode to the burner head.

A further object of the invention is to provide a welding device which includes a novel burner head construction for a welding apparatus in which the burner head is connected to a flexible cable for supplying a protective gas and for feeding a consumable welding electrode which is adapted to be connected at the apparatus for supplying current and the protective gas by means of a pivotal plug and socket connection, and which further includes a burner head having a control switch button mounted thereon at a peripheral location and with a nozzle portion of the head through which the consumable electrode and the protective gas are discharged, which is pivotal in respect to the remaining portion of the burner head.

A further object of the invention is to provide a welding device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 1:
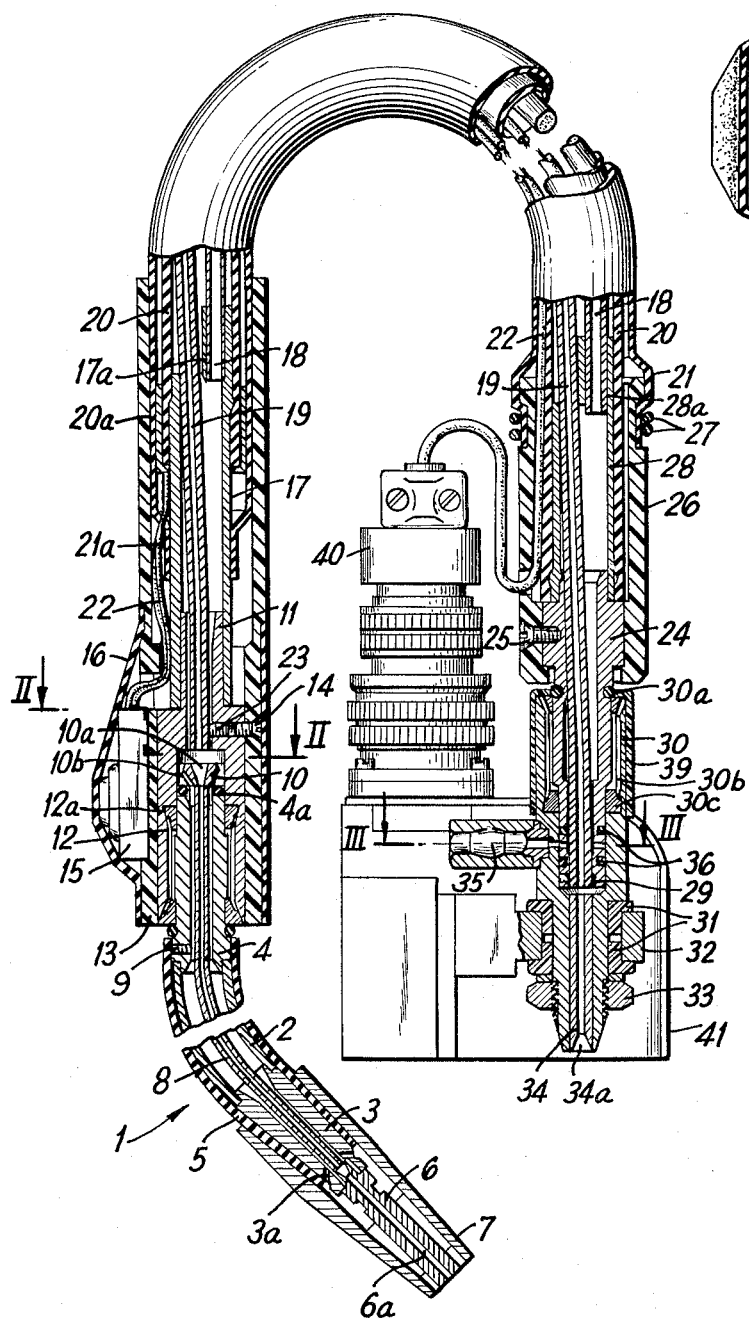
FIG. 1 is a partially transverse sectional and partially elevational view of a welding system constructed in accordance with the invention.

Referring to the drawing in particular, the invention embodied therein comprises a burner head assembly generally designated 1 which comprises a cylindrical head portion having control means thereon and a forward nozzle portion which is made pivotal in respect to the head portion.

In accordance with the invention, the burner head 1 comprises a burner pipe 2 which is curved and is connected at its front end to a conical burner nozzle element or member 3 such as by soldering. The rear end of the burner pipe 2 is connected to a cylindrical hollow plug member 4. The burner pipe 2 is covered with a protective tube 5 made of silicon rubber which also partly covers the burner nozzle 3 and the plug 4. A contact pipe 6 which is provided with a guide bar 6a for the welding wire (not shown) is screwed into the burner nozzle 3 at its front end. A gas nozzle 7 is firmly attached on the exterior part of the protective tube 5 which overlies the conical part of the burner nozzle 3.

A curved wire conduit member 8 connects at its forward end to the contact pipe 6 and includes a bore in alignment with the bore 6a for guiding the electrode wire. The wire conduit member 8 is retained by a threaded pin 9 screwed into the plug 4 at its forward end. A nipple 10 is engaged in the rear part of the plug 4 and is provided with an external taper 10a for facilitating the feeding of the electrode wire through a bore of the nipple 10 which aligns with the bore of the conduit member 8.

Figure 2:
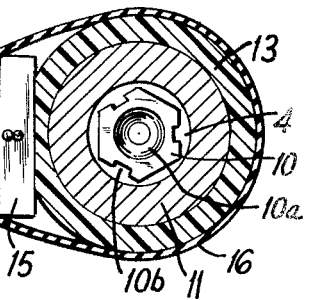
FIG. 2 is a section taken on the line II—II of FIG. 1.

The exterior of the nipple 10 is provided with axially extending slots 10b (see FIG. 2) through which a protective gas is directed for flow in the space between the wire conduit member 8 and the plug 4. The gas then flows within the walls of the burner pipe 2 to the burner nozzle 3 and passes through obliquely directed bores 3a into the space between the contact pipe and the gas nozzle 7.

The entire front portion of the burner head, including the plug 4 at the rear end thereof, is plugged into a contact socket 11 and is sealed in relation to the socket by means of an O-ring 4a. The plug 4 is secured in the socket 11 by means of a snap-in detention, and it is possible to release the forward portion of the burner head from the remaining portion only by pressing the plug 4 further into the socket 11 by a little more than 1 mm. and then pulling it out. In the contact socket 11 there are several contact laminations 12 which are secured by means of a conical ring 12a. The laminations are arranged all around the plug 4 and elastically bear against the latter.

A pipe 13 of insulating material serving as a handle is fitted over the socket 11 and secured against axial displacement by means of a countersunk screw 14 which is screwed in the socket 11. The handle 13 is provided with a recess in which is mounted a control switch 15 which may be manipulated by the welder's finger, such as by his thumb. The control switch 15 is covered by a rubber cover 16 which permits easy manipulation thereof. The contact socket 11 is inserted into a contact pipe 17 and soldered to the latter. The rear end 17a of the contact pipe receives a welding current cable 18 which, together with an electrode wire conduit 19, is contained in a tube 20. The wire conduit 19 includes a bore which is aligned with the bore of the nipple 10 for feeding the wire into the wire conduit member 8. The tube 20 is fitted over the rear portion of the contact pipe 17 and sealed by means of a tube flange 20a and secured against axial displacement. A protective tube 21 is fitted over the tube 20 and it is retained on the contact pipe 17 by means of a tube flange 21a. Between the two tubes 20 and 21 there is mounted a multi-strand control current cable 22 which extends out of the protective tube 21 and is connected to the control switch 15. The electrode wire conduit 19 is introduced into the rear offset end of the contact pipe 17 and is retained at its front end in the contact socket 11 by means of a threaded pin 23.

The tube packet formed by the two tubes 20 and 21, the welding current cable 18, the control current cable 22 and the welding wire conduit 19 terminates in a plug 24 at the end to be connected to the welding apparatus. The plug 24 is retained within an insulating handle 26 which is firmly connected with the plug by a screw 25. The outer protective tube 21 is flanged at its outer end and secured around the protective handle 26 by means of two O-rings 27, 27. The inner tube 20 is arranged in contact with a contact pipe 28 which is soldered to the plug 24. An offset end 28a of the contact pipe 28 is arranged in pipe pressing engagement with the current cable 18. The wire conduit 19 is passed through the offset rear part of the contact pipe 28 and secured in the plug 24 by means of a threaded end 29. The control current cable 22 is passed through an opening in the insulated handle 26 and connected through a multi-pole control current plug 40 with the welding apparatus 41. As is the case with the burner head 1, the plug 24 is plugged into a socket 30 and secured against falling out by snap-in retention 30a. At this end of the connecting cable there are also provided contact laminations 30b which are fastened in the socket 30 by means of a conical ring 30c which bears elastically against the plug 24.

Figure 3:
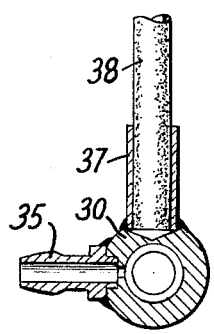
FIG. 3 is a section taken on the line III—III of FIG. 1.

The socket 30 which is insulated by spaced cylindrical ferrules 31 is mounted in the support 32 of the apparatus 41 and secured against axial displacement by a nut 33. A socket 34 made of hard steel and provided with an inside taper 34a is pressed into the plug socket 30 and facilitates the easy and exact introduction of the welding wire (not shown) into the welding wire conduit 19. The introduction of the protective gas into the plug 34 is through a nipple 35 which is soldered into the plug socket 30 and connected to a gas tube (not shown) as well as through aligned cross bores in the socket 30 and in the plug 24. The packing between plug 24 and the socket 30 is provided by the O-rings 36 arranged on each side of the point of introduction. Welding current introduction to the socket 30 is made by means of a feed cable 38, as indicated in FIG. 3, which connects through a pipe 37 soldered into a side of the socket 30. A sleeve 39 of insulating plastic is fitted over the plug socket 30 and serves as a protection against contact.

The path of the welding current leads from the feed cable 38 through the plug connection 30, plug 24, contact pipe 28, welding current cable 18, contact pipe 17, contact socket 11, contact laminations 12 and the plug 4, to the burner pipe 2, nozzle 3 and contact pipe 6.

The protective gas flows in the plug 24, contact pipe 28, tube 20, contact pipe 17, and in the rear portion of the contact socket 11 always in the direct vicinity of the wire conduit 19 over its entire path from the welding apparatus 11 to the burner head 1. In addition, the protective gas also flows around the wire conduit member 8 and around the contact pipe 6. A small portion of the protective gas passes into the centering nippel 10 and flows between the wire conduit 8 and the welding wire positioned therein and subsequently through the bore 6a of the contact pipe 6 to the welding point.

Due to the plug connection between the plug 4 and the contact socket 11, the burner head 1 includes a rotatable nozzle portion at the front which is rotatable about the axis of a cylindrical rear portion. This means that the nozzle portion is easily adjustable both before and during welding for positioning in respect to a work piece and in respect to a control switch 16, so that the welder can at all times keep the burner head in an adaptable position, depending on the working method and the adaptation to the particular working situation, and without changing the most favorable orientation of the control switch in relation to his hands.

A further advantage of the plug connection of the plug 4 and the socket 11 is that a burner head which has become defective can be easily exchanged or a different type of burner head may be substituted where a different welding procedure is desired.

Thus, all of the connections, that is, for the delivery of the welding wire, the protective gas and the welding current are combined in a single plug type unit with connecting cable, there is not only favorable control but also a reduced tendency to trouble with the various connections. These advantages can be achieved not only at the junctions between the various components of the burner head, but also between the connecting cable and the welding apparatus.

While a specific embodiment of the invention has been shown and described in detail to illustrate the application of the principles of the invention, it will be understood that this invention may be embodied otherwise without departing from such principles.

What is claimed is:

A shielded gas metallic arc welding system, employing a consumable wire electrode, comprising, in combination, a nozzle assembly; welding apparatus for supplying welding current, gas and a consumable wire electrode to said nozzle assembly; a cable having a first end connected to said welding apparatus and a second end connected to said nozzle assembly; said nozzle assembly including a handle portion and a longitudinally curved nozzle rotatably mounted in said handle portion, said second end of said cable being connected to said handle portion; the connection between said handle portion and said nozzle including a receptacle member and a plug member having a snap action releasable engagement in said receptacle member, and said plug member and said receptacle member being freely relatively rotatable with respect to each other; said nozzle member including current conducting means providing a central passage for the wire electrode in electrically conductive engagement with said current conducting means, and said current conducting means defining, with an outer wall of said nozzle, in annular passage for the gas; said nozzle having gas passage means extending therethrough and in communication with said annular passage; said handle portion and said nozzle having wire electrode guide means in continuous alignment with each other in all angular positions of said nozzle relative to said handle portion, and said handle portion having gas conduit means in continuous communication with the gas passage means in said nozzle in all angular positions of said nozzle relative to said handle portion; first electric conductor means connected to said current conducting means in said nozzle and extending to the end of said nozzle engaged in said handle portion; brush means in said handle portion in continuous electrical contact with said first electric conductor means; said cable enclosing an elongated wire electrode guide communicating with the electrode guide means in said handle portion, circuit means continuously communicating with the gas conduit means in said handle portion, and second electric conductor means in continuous connection with said brush means; said first cable end having a disengageable, rotation-providing connection to said welding apparatus, said last-named connection including a receptacle member and a plug member, one of said members being fixed relative to said welding apparatus and the other of said members being fixed relative to said first end of said cable; said welding apparatus having a wire electrode guide in continuous registery with the wire electrode guide extending through said cable; said welding apparatus having gas supply means communicating with said conduit means in said cable; said one member having electrically conductive brush means in continuous engagement with said second electric conductor means extending through said cable; a control switch on said handle portion of said nozzle assembly; and conductor means extending through said cable and connecting said control switch to said welding apparatus; whereby said nozzle may be angularly adjusted relative to said handle portion while maintaining the several connections therebetween fully operative, and said cable may be angularly displaceable relative to said welding apparatus while maintaining the connections therebetween fully operative.

References Cited by the Examiner

UNITED STATES PATENTS

| 2,952,766 | 9/1960 | Craig et al. | 219—130 |
| 3,108,179 | 10/1963 | Ulli | 219—130 |
| 3,112,392 | 11/1963 | Orr et al. | 219—130 |
| 3,155,811 | 11/1964 | Adamson et al. | 219—130 |

RICHARD M. WOOD, *Primary Examiner.*